United States Patent [19]
Ogata et al.

[11] Patent Number: 5,225,014
[45] Date of Patent: Jul. 6, 1993

[54] PROCESS FOR PRODUCING PRECISION CARTRIDGE FILTER

[75] Inventors: Satoshi Ogata; Kazuyuki Nagae; Yoshimi Tsujiyama, all of Moriyama, Japan

[73] Assignee: Chisso Corporation, Ohsaka, Japan

[21] Appl. No.: 724,862

[22] Filed: Jul. 2, 1991

[30] Foreign Application Priority Data

Jul. 2, 1990 [JP] Japan .................. 2-174835
Nov. 1, 1990 [JP] Japan .................. 2-296394

[51] Int. Cl.$^5$ .............................................. D04H 3/16
[52] U.S. Cl. ..................... 156/73.2; 156/167; 156/173; 156/184; 156/272.2; 264/23; 264/25; 264/115; 264/121; 264/125; 264/171; 264/173; 264/209.3; 264/518; 264/555
[58] Field of Search ............ 264/23, 25, 103, 115, 264/121, 125, 171, 173, 209.1, 209.3, 211.14, 517, 518, 555; 156/73.2, 167, 172, 173, 184, 272.2; 210/496, 497.01, 505

[56] References Cited

U.S. PATENT DOCUMENTS

| | | | |
|---|---|---|---|
| 4,021,281 | 5/1977 | Pall | 156/167 |
| 4,197,156 | 4/1980 | Nakajima et al. | 156/184 X |
| 4,726,901 | 2/1988 | Pall et al. | 210/496 |
| 4,861,633 | 8/1989 | Abe | 264/103 X |

FOREIGN PATENT DOCUMENTS 56-43139 10/1981 Japan .
56-49605 11/1981 Japan .
60-216818 10/1985 Japan .

*Primary Examiner*—Leo B. Tentoni
*Attorney, Agent, or Firm*—Fay, Sharpe, Beall, Fagan, Minnich & McKee

[57] ABSTRACT

A precision cartridge filter having an average filter diameter of 10 μm or less is produced by preparing a web composed of conjugate microfine fibers by a conjugate melt-blowing process, wherein the conjugate microfine fibers have a lower melting point component, a higher melting point component, and a melting point difference between the lower melting point component and higher melting point component of 20° C. or more; followed by heating and molding the web at a temperature greater than or equal to the melting point of said lower melting point component, but less than the melting point of said higher melting point component.

15 Claims, No Drawings processing said web into a non-woven fabric is carried out prior to said step of winding up.

(6) A process for producing a precision cartridge filter as set forth in item (1), (3) or (4), wherein the lower melting point component and the higher melting point component of said microfine conjugate fibers are combinations of thermoplastic resin selected from the group consisting of polyethylene/polypropylene, polyester/copolymerized polyester, polyethylene/polyester, and polypropylene/polyester.

(7) A process for producing a precision cartridge filter as set forth in item (1), (3) or (4), wherein said conjugate melt-blowing process comprises steps of melting a lower melting point thermoplastic resin melting a a higher melting point thermoplastic resin subjecting the resulting resins to conjugate spinning through a die for melt-blowing, provided with spinning nozzles from the periphery of which a high temperature gas is blown at a high speed; and blowing the resulting conjugate fibers onto a collecting net conveyer by means of the high temperature gas to prepare the web of conjugate microfine fibers.

DETAILED DESCRIPTION OF PREFERRED EMBODIMENTS

The conjugate melt-blowing process referred to in the present invention means a process of independently melting two kinds of thermoplastic resins having a lower melting point and a higher melting point, respectively, subjecting them to conjugate spinning through a die for melt-blowing, provided with spinning nozzles from the periphery of which a high temperature gas is blown at a high speed, and blowing the resulting conjugate fibers onto a collecting net conveyer to obtain a web of microfine fibers. The die for conjugate fibers is exemplified by a sheath-and-core type, side by side type, etc., and as the gas for melt-blowing, air, inert gases, etc. usually at 0.5 to 5 kg/cm$^2$, 400° C. and in a flow quantity of 1 to 40 m$^3$/min. are generally used. The distance between the die for melt-blowing and the conveyer varies depending upon the melting point of the thermoplastic resins, the blowing conditions of the gas, etc. However the distance is determined so as not to cause a melt-adhesion of the fibers, and it is preferably about 30 to 80 cm.

The cross-sectional shape of the fibers may be circular shape, triangle shape, T letter shape or a shape further provided with a hollow part in the above shapes.

Examples of the resin of the fibers of the present invention are combinations of polyamides, polyesters, polyvinylidene chloride, polyvinyl acetate, polystyrene, polyurethane elastomer, polyester elastomer, polypropylene, polyethylene, copolymerized polypropylene, etc. or the mixtures of the foregoing. The melting point difference between the lower melting point component and the higher melting point component is at least 20° C. If the melting point difference is less than 20° C., the higher melting point component also softens or melts at the time of heating thus, the fiber shape collapses to form a film. If the cartridge melts to form a film and the pore collapses, this has a great influence upon the filtrability, such as reduction in the water-permeability. The melting point referred to herein is generally measured by means of a differential scanning calorimeter (DSC) in which the melting point appears in the form of an endothermic peak. In the case of non-crystalline, low melting point copolymerized polyesters, etc., since the melting point does not always appear clearly, it may be substituted with the softening point which is measured by a differential thermal analysis (DTA). Examples of conjugate combinations are polyethylene/polypropylene, polyester/copolymerized polyester having a lower melting point, polyethylene/polyester, polypropylene/polyester etc., but the combinations are not limited to those.

As to heating for forming the cartridge, the web of microfine fibers according to the conjugate melt-blowing process is heated to a temperature greater than or equal to the melting point of a lower melting point component, but less than the melting point of a higher melting point component of the conjugate fibers. The web may be formed under heat into a cylindrical shape of a cartridge using a forming device provided with a conveyer, a heater and a winding-up means, or the web may be once wound up on a core, and heating the web on the core, followed by cooling the web to room temperature, and drawing out the core to obtain a cylindrical shape of a cartridge. The web may be processed to form a non-woven fabric before the above processing. As for a heating process for the web (or the non-woven fabric), a heat emboss process, a heat calendar process, a hot air process, a supersonic process, a far infrared heating process, etc. are exemplified. In particular, according to the far infrared heating process, the web obtained by the conjugate melt-blowing process is not disturbed to obtain small unevenness of the thickness, and uniform melt adhesion is effected so that the filtrability is stabilized.

The fiber diameter of the cartridge filter obtained in the present invention is 10 µm or less. If it exceeds 10 µm, the filtration accuracy of the cartridge filter is lowered and also the diameter of flowing-out particles increases. The average fiber diameter was determined by average value in a photograph of a scanning electron microscope inside the cartridge.

In the cartridge filter of the present invention, conjugate microfine fibers according to melt-blowing process are used and the higher melting point component of the conjugate fibers are three-dimensionally bonded to one another by means of the lower melting component of the conjugate fibers; hence as to the pore structure, the pores are not broadened even by variation of water pressure, etc. and a highly accurate filtration is stably effected; and the filtration accuracy was as high as 1 µm, for example.

Further, the cartridge filter of the present invention is of a structure composed of the conjugate microfibers made by a conjugate melt-blowing process, tightly joined to one another without using another kind of stock such as sheet; hence a high pressure and high viscosity fluid is stably filtered. Further, since the lower melting point component of the fibers are melt-bonded to one another at the contacting points thereof to make the higher melting point fibers a stiff structure, a central supporting member is made unnecessary to simplify the preparation of the cartridge and thereby obtain a cheap cartridge.

Further, since the cartridge filter of the present invention is unnecessary to use an antistatic agent (oiling agent) for fiber processing, it can be used even in the food field and in the field of precision filtration, without washing.

Since the process for producing a cartridge filter of the present invention comprises spinning conjugate microfine fibers according to the conjugate melt-blowing process and continuously carrying out spinning and

PROCESS FOR PRODUCING PRECISION CARTRIDGE FILTER

BACKGROUND OF THE INVENTION

1. Field of the Invention

This invention relates to a process for producing a precision, cylindrical cartridge filter, by subjecting a web composed of conjugate melt-blown microfine fibers to forming under heat into a shape of a cartridge filter.

2. Field of the Related Art

A cartridge filter using melt-blown fibers (hereinafter often referred to as cartridge) is disclosed in Japanese patent application laid-open No. Sho 60-216818. Further, Japanese patent publication No. Sho 56-43139 discloses a process for producing a cylindrical fiber aggregate by after forming a web of conjugate short fibers by means of a carding machine, rolling up the web under heat. Still further, Japanese patent publication No. Sho 56-49605 discloses a process of inserting a sheet-form material having small pores into an intermediate portion of a cartridge.

However, the melt-blown fibers of the above Japanese patent application laid-open No. Sho 60-216818 are composed of a single component, a material having almost no bond of fibers to one another and retained by mechanical snarl or entanglement to one another and further having weak strength in the form of a cartridge filter; thus the fibers employ a structure provided with a central supporting member, so that filter production is not simple. Further, the fibers have a percentage of void as high as 80 to 90% so that it is difficult to retain the outer diameter of the cartridge filter even when it is used under low pressure. In particular, the smaller the particles to be filtered, the smaller the fiber diameter of the filter, so that notable shrinkage of the outer diameter of the filter occurs, resulting in anxious filtrability.

In the case of the cartridge using conjugate fibers, disclosed in the above Japanese patent publication No. Sho 56-43139, since short fibers cut to a definite length are processed, the fineness (denier) and the cut length of the fibers used have been naturally restricted. On the present level, stabilized carding of fibers of 1 d/f (denier/filament) or less is so difficult that it has been impossible to produce a cartridge capable of filtering off impurities of 10 $\mu$m or less. In order to overcome such a drawback, the above Japanese patent publication No. Sho 56-49605 discloses a process of inserting a sheet-form material having small pores into an intermediate layer of a cartridge. However, the difference between the diameter of the fibers composing the sheet-form material and the diameter of the fiber of the cartridge body is so large that it is presumed that the layer of the sheet-form material works as a rate-determining step in a mechanism of surface layer filtration as in the case of membrane pleat filter. Further, such a sheet-form material is of a different kind of a stock from that of the stock constituting the cartridge, so that there have been problems of ply separation, etc. in the case of filtration of a high pressure and high viscosity fluid. Further, in the case of using short fibers, in order to improve the handling of the processing, an antistatic agent (oiling agent) has so often been attached to the fibers. Thus, such a cartridge prepared from the fibers having the oiling agent, the oiling agent dissolves in a filtrate and bubbles at the initial stage of filtration, so that it is the present status that the cartridge can be expressly washed and used in the field of foods or in a precision filtration.

SUMMARY OF THE INVENTION

The object of the present invention is to provide a process for producing a cartridge filter having a stabilized filtrability the pore diameter of which governing a filtration accuracy is not broadened by a filtration pressure, and needing no central supporting member and no oiling agent.

The present invention has the following constitutions: (1) A process for producing a precision cartridge filter which process comprises the following steps of:

preparing a web composed of conjugate microfine fibers by a conjugate melt-blowing process, wherein the conjugate microfine fibers are comprised of a lower melting point component, a higher melting point component, and a melting point difference between the lower melting point component and the higher melting point component of 20° C. or more; and heating and molding said web at a temperature greater than or equal to the melting point of the lower melting point component, but less than the melting point of the higher melting point component, to form a cartridge filter having an average fiber diameter of 10 $\mu$m or less.

(2) A process for producing a precision cartridge filter as set forth in item (1), wherein a step of processing said web into a non-woven fabric is carried out prior to said step of heating and molding.

(3) A process for producing a precision cartridge filter which process comprises the following steps:

preparing a web composed of conjugate microfine fibers by a conjugate melt blowing process wherein said conjugate microfine fibers are comprised of a lower melting point component, a higher melting point component, and a melting point difference between the lower melting point component and the higher melting point component of 20° C. or more;

winding up said web on a core while heating said web at a temperature greater than or equal to the melting point of said lower melting point component, but less than the melting point of said higher melting point component, to form a cylindrical body of a cartridge filter on the core; and cooling said cylindrical body to room temperature to obtain a cartridge filter having an average fiber diameter of 10 $\mu$m or less.

(4) A process for producing a precision cartridge filter which process comprises the following steps:

preparing a web composed of conjugate microfine fibers by a conjugate melt-blowing process, wherein the conjugate microfine fibers are comprised of a lower melting point component, higher melting point component, and a melting point difference between the lower melting point component and the higher melting point component of 20° C. or more;

winding up said web on a core to form a cylindrical body of a cartridge filter on the core;

heating said cylindrical body at a temperature greater than or equal to the melting point of the lower melting point component, but less than point of the higher melting point component: and cooling said cylindrical body to room temperature to obtain a cartridge filter having an average fiber diameter of 10 $\mu$m or less.

(5) A process for producing a precision cartridge filter according to item (3) or (4), wherein a step of forming, the production yield of the cartridge filter has been improved.

The present invention will be described in more detail by way of Examples, but it should not be constructed to be limited thereto. In addition, the measurement methods described in Examples were determined according to the following methods:

Filtration Accuracy

One cartridge is fixed to a housing and water is passed therethrough from a 30 l water vessel by circulation by means of a pump. After the flow quantity was adjusted to 30 l/min, 5g of a cake of carborundum (#4000) is added to the water vessel. One minute after the addition of the cake, 100cc of the filtered water is sampled and is filtered through a membrane filter (capable of collecting particles of 0.6 $\mu$m or more), and the particle size of the cake collected on the membrane filter was measured by means of a particle size distribution measurement device in which the number of particles of each particle diameter was counted, to render the maximum diameter of flowing-out particles as filtration accuracy.

Compressive Strength

One cartridge is fixed to a housing and water is passed therethrough from a 30 l water vessel by circulation by means of a pump in a flow quantity set to 30 l/min. Into the water vessel is added a material (20 g) having an average particle diameter of 12.9 $\mu$m and a distribution wherein particles of 40 $\mu$m or less occupy 99% of the total particles, obtained by grinding and classifying the lower layer earth of volcanic ash soil, followed by agitating it, carrying out circulating filtration and reading the inlet pressure and the exit pressure when the fluid inside the water vessel becomes clear. Addition of the classified material of the volcanic soil and reading of the pressure difference at the time of the clarification are repeated, and the maximum pressure loss (difference between the inlet pressure and the exit pressure) at the time when the outer diameter of the cartridge has been deformed is measured to render the compressive strength.

Average Fiber Diameter

The respective five portions of a web or the inside of a cartridge are sampled, and the respective portions are photographed by means of a scanning electron microscope. With each photograph, the fiber diameters of optional 20 ends of the fibers are measured, to obtain an average fiber diameter of the total 100 ends.

EXAMPLE 1

A polypropylene having a melting point of 165° C. and a melt flow rate (g/10 min., 230° C.) of 35 as a core component of a conjugate fiber and a linear low density polyethylene having a melting point of 122° C. and a melt index (g/10min., 190° C.) of 25 as a sheath component of the conjugate fiber were spun in a conjugate ratio of 50/50 and at 260° C./260° C., using a die for sheath-and-core type melt-blowing, followed by introducing high pressure air to blow it onto a metal gauze conveyer, to obtain a microfine fiber web. This web had an average fiber diameter of 2.6 $\mu$m, a basis weight of 49.0 g/m$^2$ and a specific volume of 25.2 cc/g. When this web was observed by means of a scanning electron microscope, melt-adhesion between the fibers was hardly observed, and the web was good without any roping or shot. This web was once wound up, followed by feeding it to a heating device provided with a conveyer and a far infrared heater, heating it at 145° C., winding up and forming on a metallic core of 30 mm in the outer diameter, cooling the resulting central core to room temperature, and drawing out the core to obtain a cylindrical cartridge of 60 mm in the outer diameter, 30 mm in the inner diameter and 250 mm long. The average fiber diameter inside this cartridge was 2.6 $\mu$m. Further, the filtrability was measured. As a result, the filtration accuracy was 2.5 $\mu$m, the compressive strength of the cartridge was 6.0 kg/cm$^2$, and the shrinkage of the outer diameter was not observed until the deformation. Further, bubbling at the initial period of the filtration was not observed at all.

EXAMPLE 2

A polyester having an intrinsic viscosity of 0.61 and a melting point of 252° C., as a higher melting point component, and the same linear low density polyethylene as used in Example 1, as a lower melting point component, were spun in a conjugate ratio of 50/50, using a die for side-by-side type melt-blowing, followed by collecting a microfine fiber web formed on a conveyer, and continuously feeding this web to the heating device and processing it in the same manner as in Example 1 to obtain a cylindrical cartridge having the same size as in Example 1. The web fed to the heating device had an average fiber diameter of 5.7 $\mu$m, a bases weight of 51.0 g/m$^2$ and a specific volume of 28.1 cc/g. The average fiber diameter inside the cartridge was 5.5 $\mu$m. The filtrability was measured. As a result, bubbling at the initial period of water passing was not observed at all. The filtration accuracy was 4.5 $\mu$m, the compressive strength of the cartridge was 7.5 kg/cm$^2$ and the shrinkage of the outer diameter was not observed until the deformation.

COMPARATIVE EXAMPLES 1 and 2

Two kinds of cartridge composed of non-conjugate melt-blown fibers of polypropylene, alone and provided with a central supporting member, were evaluated according to the same measurement method as described above. One of the cartridge samples have (1) a designation accuracy of 0.5 $\mu$m (fiber diameter: 0.9 $\mu$m) and the other sample has a designation accuracy of 1 $\mu$m (fiber diameter: 1.2 $\mu$m). As a result, the values of the filtration accuracy scattered at each measurement, but their average values were (1) 5 $\mu$m and (2) 9 $\mu$m, respectively. Further, the compressive strength was as low as 1.8 kg/cm$^2$ and also the shrinkage of the outer diameter was notable.

EXAMPLE 3

In Example 2, a polypropylene having a melting point of 162° C. and a melt flow rate (g/10min., 230° C.) of 85 as a first component (a higher melting point component) and a polyethylene having a melting point of 122° C. and a melt index (g/10min., 190° C.) of 48 as a second component (a lower melting point component) were spun using the same die as in Example 2, at 260° C./260° C., in a conjugate ratio of 50/50, followed by blowing the resulting fibers onto a metal gauze by high pressure air at 360° C., to obtain a microfine fiber web. This web had an average fiber diameter of 0.7 $\mu$m. a basis weight of 49.0 g/m$^2$ and a specific volume of 29.7 cc/g. This web was heated to 140° C. and processed in the same manner as in Example 2 to prepare a cylindrical cartridge having an outer diameter of 60 mm, an inner diameter of 30 mm and a length of 250 mm. This cartridge had an average fiber diameter of 0.7 μm. Further, its filtrability was evaluated to give a filtration accuracy of 0.8 μm. The compressive strength was 6.5 kg/cm², and the outer shape shrinkage was not observed until deformation. Further, bubbling at the initial period of filtration was not observed at all.

EXAMPLE 4

In Example 1, before the web blown onto the metal gauze conveyer was sent to the heat treatment device, it was once treated by a calender roll at 110° C. and a linear pressure of 8 kg/cm to obtain a non-woven fabric.

This non-woven fabric was heated to 140° C. using the same device as in Example 1 to prepare a cylindrical cartridge having an outer diameter of 60 mm, an inner diameter of 30 mm and a length of 250 mm. This cartridge had an average fiber diameter of 2.6 μm. Further, its filtrability was evaluated to give a filtration accuracy of 2.4 μm. Further, the compressive strength was 7.7 kg/cm², and the outer shape shrinkage was not observed. Further, bubbling at the initial period of filtration was not observed at all.

EXAMPLE 5

A microfine fiber web was obtained using the same device and processed in the same manner as in Example 1, except that a polyester having an intrinsic viscosity of 0.60 and a melting point of 252° C., as a core component, and a lower melting point, copolymerized polyester composed mainly of terephthalic acid, isophthalic acid and ethylene glycol and having an intrinsic viscosity of 0.58 and a melting point of 160° C., as a sheath component, were spun at 285° C./270° C. blowing a high pressure air of 360° C. The web had an average fiber diameter of 1.8 μm, a basis weight of 49.5 g/m² and a specific volume of 23 cc/g. This web was observed by a scanning electron microscope. As a result, adhesion between the fibers was hardly observed, and the web was good without any roping or shot. The web was once wound up and heated to 200° C. using the same device and processed in the same manner as in Example 1 to prepare a cylindrical cartridge having the same size as in Example 1. This cartridge had an average fiber diameter of 1.9 μm. Further, its filtrability was evaluated to give a filtration accuracy of 1.4 μm. Further, it had a compressive strength of 7.5 kg/cm² and the outer shape shrinkage was not observed until its deformation. Further, bubbling at the initial period of filtration was not observed at all.

What we claim is:

1. A process for producing a precision cartridge filter, which comprises the steps of:
   (a) preparing a web comprised of conjugate microfine fibers by a conjugate melt-blowing process, wherein said conjugate microfine fibers are comprised of a lower melting point component, a higher melting point component, and a melting point difference between said lower melting point component and said higher melting point component of 20° C. more; and
   (b) heating and molding said web at a temperature greater than or equal to the melting point of said lower melting point component, but less than the melting point of said higher melting point component, to obtain a cartridge filter having an average fiber diameter of 10 μm or less.

2. A process for producing a precision cartridge filter according to claim 1, wherein a step of processing said web into a non-woven fabric is carried out prior to said step of heating and molding.

3. A process for producing a precision cartridge filter according to claim 1, wherein said lower melting point component and said higher melting point component of said conjugate microfine fibers are combinations of thermoplastic resins selected from the group consisting of polyethylene/polypropylene, polyester/copolymerized polyester, polyethylene/polyester, and polypropylene/polyester.

4. A process for producing a precision cartridge filter according to claim 1, wherein said conjugate melt-blowing process comprises the steps of:
   (a) melting a lower melting point thermoplastic resin;
   (b) melting a higher melting point thermoplastic resin;
   (c) subjecting the resulting resins to conjugate spinning through a die for melt-blowing, wherein said die is provided with spinning nozzles from the periphery of which a high temperature gas is blown at a high speed; and
   (d) blowing the resulting conjugate fibers onto a collecting net conveyor by means of the high temperature gas to prepare said web of conjugate microfine fibers.

5. A process for producing a precision cartridge filter according to claim 1, wherein said step of heating said web is carried out by a process selected from the group consisting of a far infrared heating process, a hot air process, a supersonic process, a heat calendar process and a heat emboss process.

6. A process for producing a precision cartridge filter, which comprises the steps of:
   (a) preparing a web comprised of conjugate microfine fibers by a conjugate melt-blowing process, wherein said conjugate microfine fibers are comprised of a lower melting point component, a higher melting point component, and a melting point difference between said lower melting point component and said higher melting point component of 20° C. or more;
   (b) winding up said web on a core while heating said web at a temperature greater than or equal to the melting point of said lower melting point component, but less than the melting point of said higher melting point component to form a cylindrical body of a cartridge filter on said core; and
   cooling said cylindrical body to room temperature to obtain a cartridge filter having an average fiber diameter of 10 μm or less.

7. A process for producing a precision cartridge filter according to claim 6, wherein a step of processing said web into a non-woven fabric is carried out prior to said step of winding up.

8. A process for producing a precision cartridge filter according to claim 6, wherein said lower melting point component and said higher melting point component of said conjugate microfine fibers are combination of thermoplastic resins selected from the group consisting of polyethylene/polypropylene, polyester/copolymerized polyester, polyethylene/polyester, and polypropylene/polyester.

9. A process for producing a precision cartridge filter according to claim 6, wherein said conjugate melt-blowing process comprises the steps of:
   (a) melting a lower melting point thermoplastic resin;

(b) melting a higher melting point thermoplastic resin;

(c) subjecting the resulting resins to conjugate spinning through a die for melt-blowing, wherein said die is provided with spinning nozzles from the periphery of which a high temperature gas is blown at a high speed; and (d) blowing the resulting conjugate fibers onto a collecting net conveyer by means of the high temperature gas to prepare said web of conjugate microfine fibers.

10. A process for producing a precision cartridge filter according to claim 6, wherein said step of heating said web is carried out by a process selected from the group consisting of a far infrared heating process, a hot air process, a supersonic process, a heat calendar process and a heat emboss process.

11. A process for producing a precision cartridge filter, which comprises the steps of:

(a) preparing a web comprised of conjugate microfine fibers by a conjugate melt-blowing process, wherein said conjugate microfine fibers are comprised of a lower melting point component, a higher melting point component, and a melting point difference between said lower melting point component and said higher melting point component of 20° C. or more;

(b) winding up said web on a core to form a cylindrical body of a cartridge filter on said core;

(c) heating said cylindrical body at a temperature greater than or equal to the melting point of said lower melting point component, but less than the melting point of said higher melting point component; and (d) cooling said cylindrical body to room temperature to obtain a cartridge filter having an average fiber diameter of 10 μm or less.

12. A process for producing a precision cartridge filter according to claim 11, wherein a step of processing said web into a non-woven fabric is carried out prior to said step of heating and molding.

13. A process for producing a precision cartridge filter according to claim 11, wherein said lower melting point component and said higher melting point component of said conjugate microfine fibers are combinations of thermoplastic resins selected from the group consisting of polyethylene/polypropylene, polyester/copolymerized polyester, polyethylene/polyester, and polypropylene/polyester.

14. A process for producing a precision cartridge filter according to claim 11, wherein said conjugate melt-blowing process comprises the steps of:

(a) melting a lower melting point thermoplastic resin;

(b) melting a higher melting point thermoplastic resin;

(c) subjecting the resulting resins to conjugate spinning through a die for melt-blowing, wherein said die is provided with spinning nozzles from the periphery of which a high temperature gas is blown at a high speed; and (d) blowing the resulting conjugate fibers onto a collecting net conveyer by means of the high temperature gas to prepare said web of conjugate microfine fibers.

15. A process for producing a precision cartridge filter according to claim 11, wherein said step of heating said web is carried out by a process selected from the group consisting of a far infrared heating process, a hot air process, and a supersonic process.

* * * * *